US010349303B2

(12) United States Patent
Weinrib et al.

(10) Patent No.: US 10,349,303 B2
(45) Date of Patent: *Jul. 9, 2019

(54) OPTIMIZATION OF DATA DELIVERY IN MOBILE NETWORKS

(71) Applicant: Disney Enterprises, Inc., Burbank, CA (US)

(72) Inventors: Jeremy A. Weinrib, New York, NY (US); Purva Rajkotia, Iselin, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,960

(22) Filed: Oct. 27, 2017

(65) Prior Publication Data

US 2018/0054754 A1 Feb. 22, 2018

Related U.S. Application Data

(63) Continuation of application No. 14/253,741, filed on Apr. 15, 2014, now Pat. No. 9,820,180, which is a continuation of application No. 11/644,763, filed on Dec. 22, 2006, now Pat. No. 8,744,470.

(51) Int. Cl.
*H04W 72/00* (2009.01)
*H04W 28/02* (2009.01)
*H04W 72/12* (2009.01)
*H04L 29/06* (2006.01)
*H04L 29/08* (2006.01)
*H04W 80/06* (2009.01)
*H04W 88/04* (2009.01)

(52) U.S. Cl.
CPC ....... *H04W 28/0268* (2013.01); *H04L 67/322* (2013.01); *H04L 69/16* (2013.01); *H04L 69/161* (2013.01); *H04L 69/32* (2013.01); *H04W 72/1242* (2013.01); *H04W 72/1231* (2013.01); *H04W 80/06* (2013.01); *H04W 88/04* (2013.01)

(58) Field of Classification Search
CPC ......... H04W 28/0268; H04W 72/1242; H04W 72/1231; H04W 80/06; H04W 88/04; H04L 67/322; H04L 69/16; H04L 69/161; H04L 69/32
See application file for complete search history.

(56) References Cited

U.S. PATENT DOCUMENTS

2007/0064609 A1* 3/2007 Igarashi ............... H04L 47/10
370/230

\* cited by examiner

*Primary Examiner* — Pakee Fang
(74) *Attorney, Agent, or Firm* — Farjami & Farjami LLP (57) ABSTRACT

There is provided a method and system for optimizing delivery of data to a mobile device over a network. According to one embodiment, the invention includes a communication stack, such as a TCP/IP stack, which includes an application protocol interface (API) between an application layer and a transport layer. According to this embodiment, the method includes receiving delivery optimization information; determining the priority of the data using the delivery optimization information; providing the priority of the data to a physical layer in the communication stack; and delivering the data to the mobile device based on the priority.

20 Claims, 6 Drawing Sheets

OPTIMIZATION OF DATA DELIVERY IN MOBILE NETWORKS

This application is a Continuation of U.S. application Ser. No. 14/253,741, filed Apr. 15, 2014, which is a Continuation of U.S. application Ser. No. 11/644,763, filed Dec. 22, 2006, now U.S. Pat. No. 8,744,470.

BACKGROUND OF THE INVENTION

1. Field of the Invention

The present invention relates generally to communication networks. More particularly, the present invention relates to optimizing the delivery of data in mobile networks.

2. Background Art

The functionality of today's mobile devices, such as cellular telephones and personal digital assistants (PDAs), has rapidly increased to allow users of such mobile devices to receive and use applications that make frequent network requests, as well as content constituting large amounts of data, such as music and videos, over a communication network. Consequently, it has become critical for the hosts delivering such data over a communication network to exercise control over the manner in which the data is delivered to optimize network traffic and to improve user experience.

A host typically uses Transport Control Protocol (TCP) and Internet Protocol (IP) (TCP/IP) to communicate with a mobile device. TCP/IP is a suite of protocols designed to allow communication between networks regardless of the technologies implemented in each network. For example, FIG. 1 of the present application illustrates various layers of conventional TCP/IP stack 100.

Figure 1:
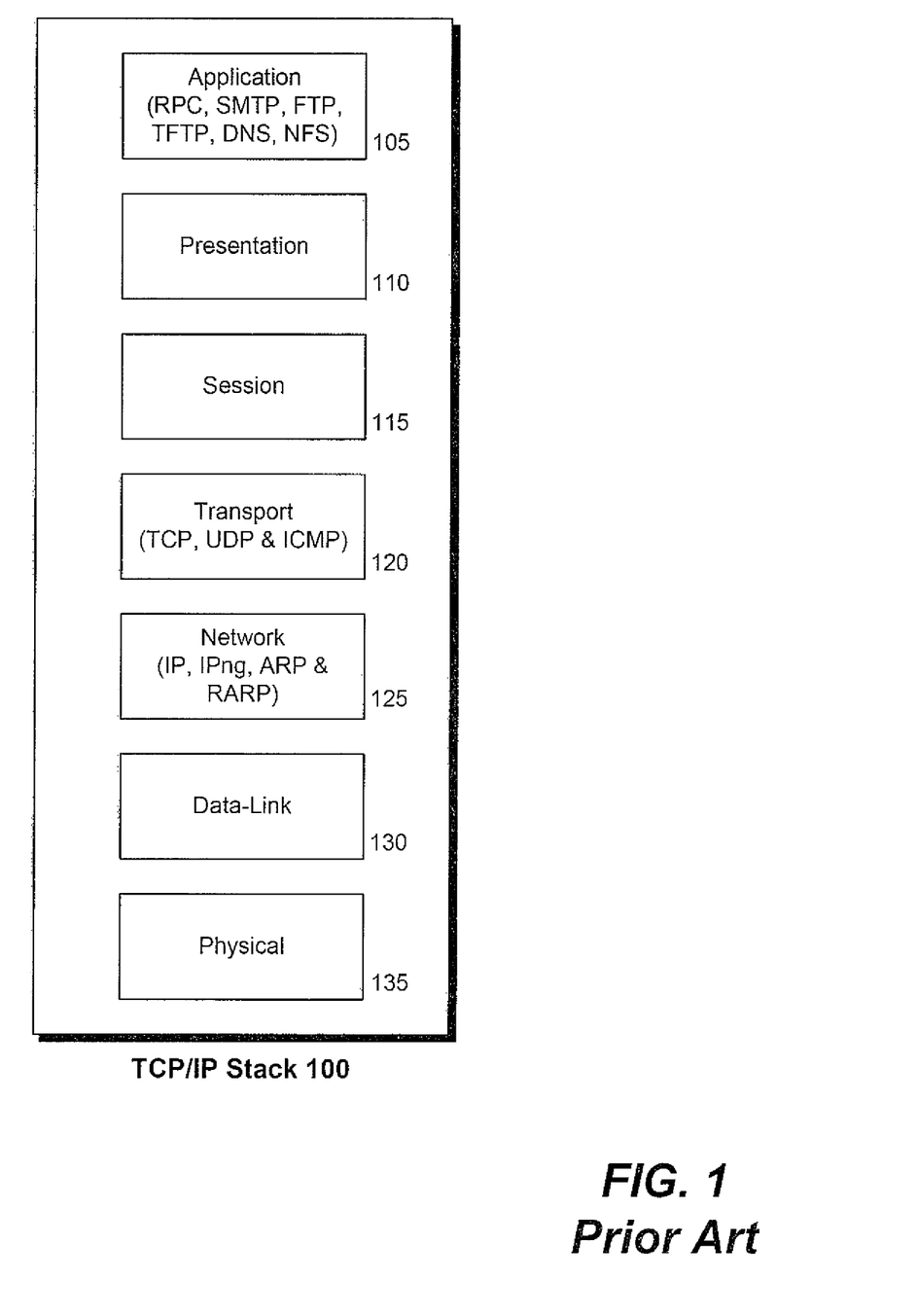
FIG. 1 is a block diagram illustrating various layers of a conventional TCP/IP stack.

As shown in FIG. 1, TCP/IP stack 100 includes application layer 105, presentation layer 110, session layer 115, transport layer 120, network layer 125, data-link layer 130 and physical layer 135. Application layer 105 is a user process cooperating with another process on the same or a different host. Examples of application layer 105 include telnet (protocol for remote terminal connections), FTP (file transfer protocol), RPC (remote procedure calls), SMTP TFTP (trivial file transfer protocol), DNS (domain name system) and NFS (network file system). Presentation layer 110 provides services such as encryption and compression of data and session layer 115 controls dialog by managing the period and timing of transmissions. Transport layer 120 provides end-to-end data transfer. The most common example transport layer 120 protocols are TCP, UDP (User Datagram Protocol) and ICMP (Internet Control Message Protocol). Network layer 125 provides a virtual network image of the internetwork and, in doing so, shields the higher layers from the lower network structure. IP is the best known of network layer 125 protocols. Data-link layer 130 provides an interface to the actual network hardware. Lastly, physical layer 135 is purely the hardware layer, such as the cable, radio-wave, satellite and network interface card.

As a packet is received by a host, the packet enters the lowest point of TCP/IP stack 100, which is physical layer 135, and travels the sequence of layers 105-135 that make up TCP/IP stack 100. Each layer then proceeds to strip-out the data it needs and passes the remaining packet, if required, to the next layer up in the stack. Likewise, when application layer 105 creates a packet, application layer 105 will pass the packet down to the next layer where further information is added by each and every subsequent layer until the packet emerges onto physical layer 135 as a full TCP/IP packet. As an example, a 30-byte packet created by application layer 105 may be sent to transport layer 120, e.g. TCP, where 20 bytes of TCP header are added to the packet. Thereafter, 20 bytes of IP header may be added by network layer 125 to the packet, and 22 bytes of Ethernet header may be added by data-link layer 130, before a full packet of 96 bytes arrives at physical layer 135 for transmission in the network. Similarly, when a packet arrives at physical layer 135, data are stripped out from the packet at each layer until a 30-byte packet arrives at application layer 105.

When multiple mobile devices request data (e.g., applications or content) from the host, for example, the host sequentially delivers the data over the network using conventional TCP/IP stack 100 in the order that the requests for the data were received. However, one or more of the mobile devices might experience poor radio frequency (RF) conditions, which can undesirably result in substantially reduced data transfer rates or dropped connections. Consequently, a request for data by a mobile device experiencing poor RF conditions can disadvantageously congest the flow of data in conventional TCP/IP stack 100, thereby degrading the performance of subsequent requests for data by other mobile devices that are experiencing good RF conditions.

Moreover, since TCP/IP stack 100 sequentially delivers data to mobile devices over the network in the order that the requests for the data were received, the flow of data in conventional TCP/IP stack 100 can also be congested, for example, by a single mobile device requesting a large amount of data. Such congestion can substantially degrade the performance of other mobile devices by causing lengthy delays in the delivery of smaller amounts of data requested by other mobile devices. Another major drawback of conventional TCP/IP stack 100 is that TCP/IP stack 100 cannot provide enhanced performance for premium users over non-premium users, since conventional TCP/IP stack 100 can only deliver data in the order that the requests for the data were received, regardless of the classification of the user (e.g., premium or non-premium). Consequently, conventional TCP/IP stack 100 cannot provide premium users with a better user experience than non-premium users.

Thus, there is a strong need in the art for a method and system for optimizing delivery of data to a mobile device over a communication network.

SUMMARY OF THE INVENTION

There are provided methods and systems for optimizing the delivery of data, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 2:
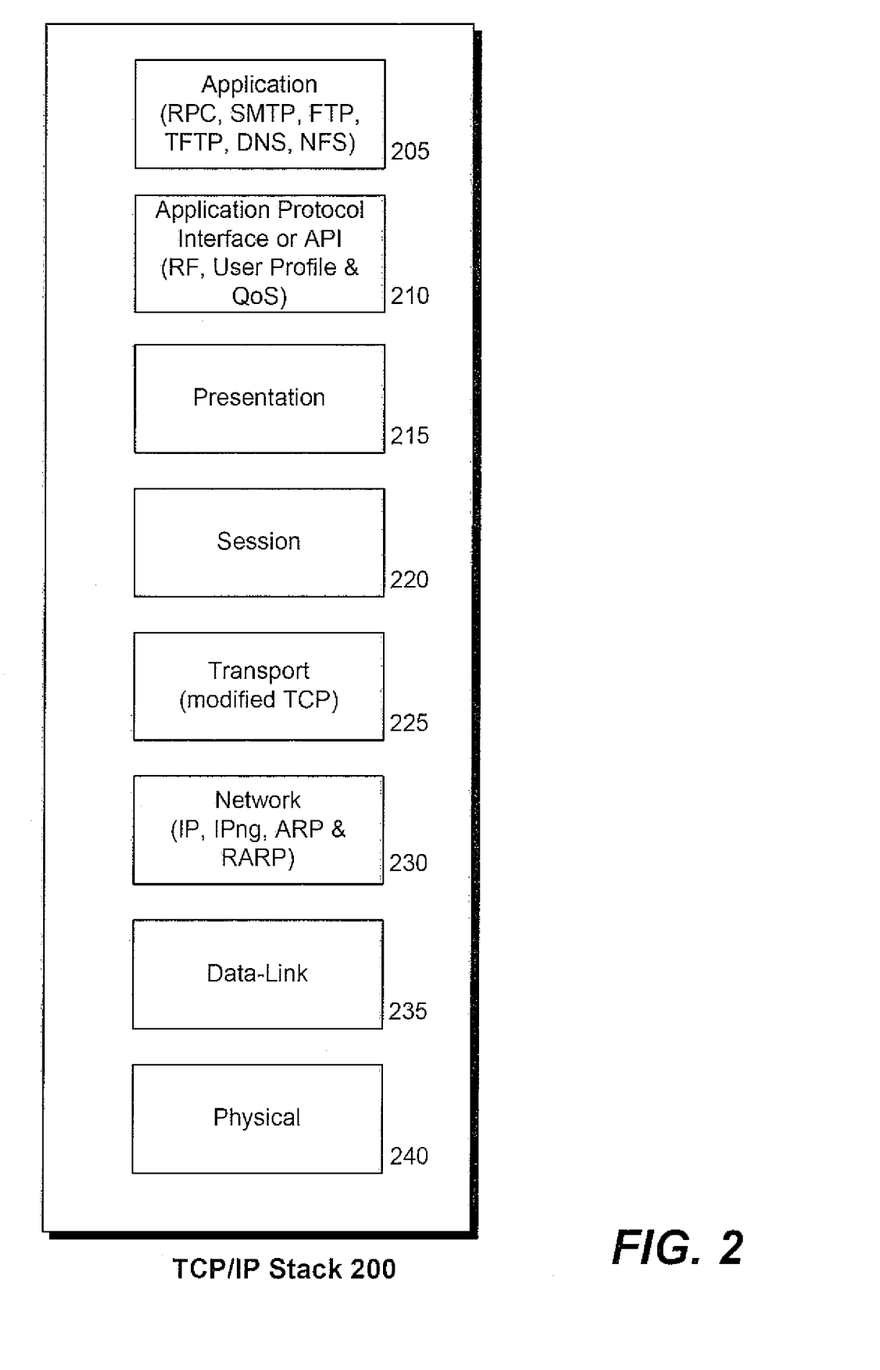
FIG. 2 is a block diagram illustrating a communication stack for optimizing delivery of data by a host to a mobile device over a network, according to one embodiment of the present invention.

FIG. 2 is a block diagram illustrating a communication stack for optimizing delivery of data by a host to a mobile device over a network according to one embodiment of the present invention. As shown in FIG. 2, TCP/IP stack 200 includes application layer 205, application protocol interface (API) 210, presentation layer 215, session layer 220, transport layer 225, network layer 230, data-link layer 235 and physical layer 240.

API 210 in TCP/IP stack 200 can be configured to receive delivery optimization information and to use the delivery optimization information to determine the priority of the data to be delivered to the mobile device and to provide the priority of the data to a lower layer in TCP/IP stack 200. The data to be delivered to the mobile device can include one or more applications or other content. For example, API 210 can be configured to receive delivery optimization information regarding network conditions from physical layer 240 in TCP/IP stack 200, such as RF condition information describing the strength and/or quality of the RF signals connecting the mobile device to the network. API 210 can then determine a priority of the data based on the RF condition information and provide the priority to physical layer 240. In other embodiments, for example, API 210 can receive delivery optimization information residing outside TCP/IP stack 200, such as quality of service (QoS) information or user profile information which can be used to determine the status of a particular user.

Transport layer 225 in TCP/IP stack 200 is modified to implement a modified TCP/IP protocol capable of accommodating more metadata than the standard TCP/IP protocol implemented in TCP/IP stack 100 in FIG. 1, thereby enabling communication between API 210 and physical layer 240. For example, the modified TCP/IP protocol can include additional fields for delivery optimization information metadata and priority metadata, which can be used to communicate delivery optimization information and priority of data between API 210 and physical layer 240.

In the embodiment of the invention shown in FIG. 2, for example, RF condition information can be extracted from packets entering physical layer 240 in TCP/IP stack 200. The RF condition information can then be communicated by physical layer 240 to API 210 by adding RF condition information metadata to the additional fields of the modified TCP protocol implemented by transport layer 225. API 210 can also be configured to receive user profile information, for example, by utilizing data associated with the user of the mobile device, e.g., the user's telephone number, to access a database containing information regarding the user's services or status. APT 210 can then use the delivery optimization information to determine a priority of the data to be delivered to a mobile device and can provide the priority of the data to physical layer 240 by adding priority metadata to the additional fields of the modified TCP protocol implemented by transport layer 225. In another embodiment, API 210 can determine the priorities of data to be delivered to a number of mobile devices based on network usage information or, in other words, based on the size of the data requested by each of the mobile devices. For example, if there is a request for a large amount of data by a single mobile device ahead of a number of requests for smaller amounts of data by other mobile devices, API 210 might determine a higher priority for the requests including smaller amounts of data than the request including a large amount of data. API 210 can then provide the appropriate priorities of the data to physical layer 240 by adding priority metadata to the additional fields of the modified TCP protocol implemented by transport layer 225. Thus, in this example, delivery of the data can be optimized by delivering the smaller amounts of data before the large amount of data, thereby preventing users requesting smaller amounts of data from being effectively "blocked" by a single user requesting a large amount of data.

Figure 3:
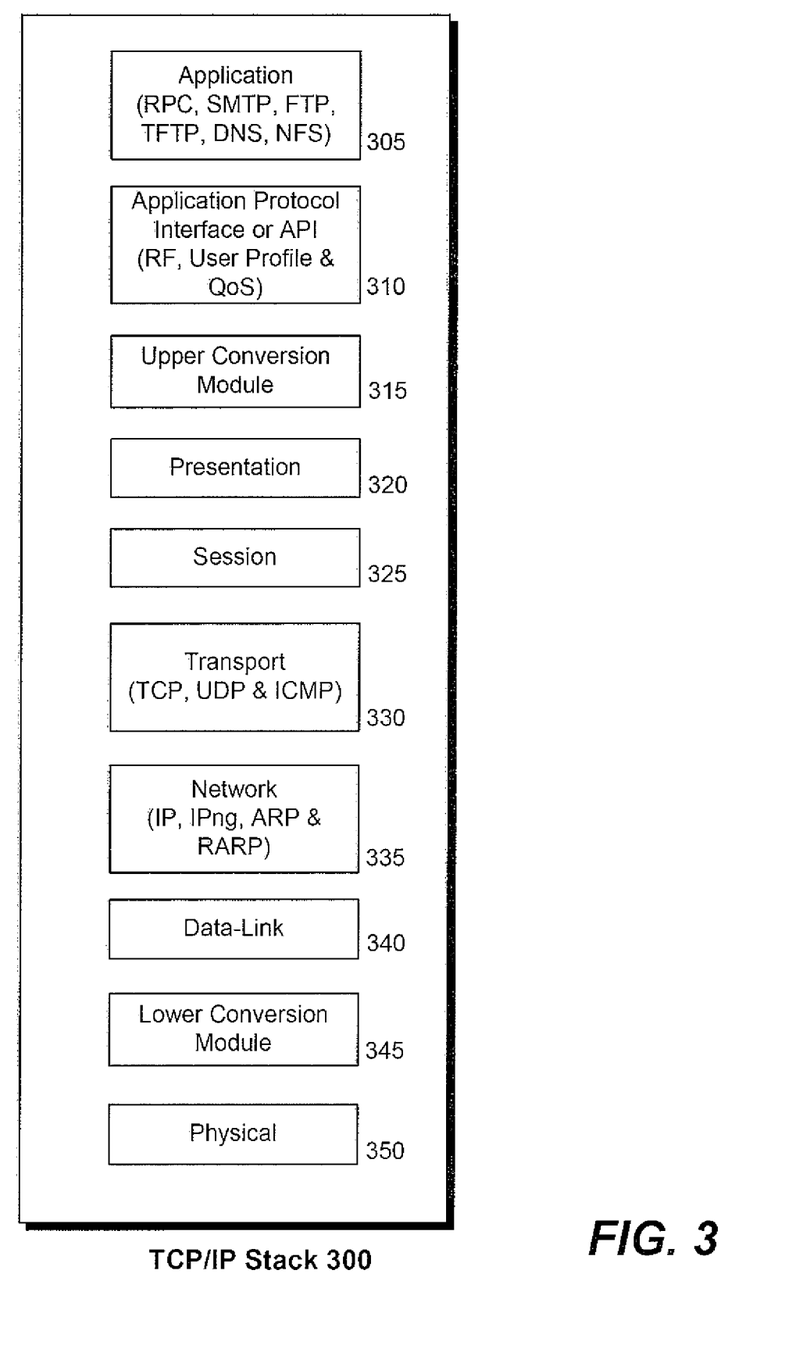
FIG. 3 is a block diagram illustrating a communication stack for optimizing delivery of data by a host to a mobile device over a network, according to one embodiment of the present invention.

FIG. 3 is a block diagram illustrating a communication stack for optimizing delivery of data by a host to a mobile device over a network according to one embodiment of the present invention. As shown in FIG. 3, TCP/IP stack 300 includes application layer 305, application protocol interface (API) 310, upper conversion module 315, presentation layer 320, session layer 325, transport layer 330, network layer 335, data-link layer 340, lower conversion module 345, and physical layer 350.

API 310 shown in FIG. 3 can be configured to receive delivery optimization information and to use the delivery optimization information to determine the priority of the data to be delivered to the mobile device and to provide the priority of the data to a lower layer in TCP/IP stack 300. For example, API 310 can be configured to receive delivery optimization information regarding network conditions from physical layer 350 in TCP/IP stack 300, such as RF condition information describing the strength and/or quality of the RF signals connecting the mobile device to the network. API 310 can then determine a priority of the data based on the RF condition information and provide the priority to physical layer 350. In other embodiments, for example, API 310 can receive delivery optimization information residing outside TCP/IP stack 300, such as quality of service (QoS) information or user profile information which can be used to determine the status of a particular user.

In the embodiment of the invention shown in FIG. 3, for example, RF condition information can be extracted from packets entering physical layer 350 in TCP/IP stack 300. Physical layer 350 can then communicate the RF condition information to API 310 by utilizing lower conversion module 345 to add appropriate RF condition information metadata to packets being passed up to higher layers in TCP/IP stack 300. Although the embodiment of the invention shown in FIG. 3 includes only one lower conversion module, other embodiments may include additional lower conversion modules. Thus, the packets containing RF condition information metadata can be communicated up to upper conversion module 315 through transport layer 330 using standard TCP protocol. The RF condition information can then be extracted by upper conversion module 315 and provided to API 310. Although the embodiment of the invention shown in FIG. 3 includes only one upper conversion module, other embodiments may include additional upper conversion modules. Thus, in one example embodiment, TCP/IP stack 300 can be configured such that RF condition information metadata is added to all packets intended for application layer 305, thereby allowing API 310 to have information about the status of network conditions at any given time.

Figure 4:
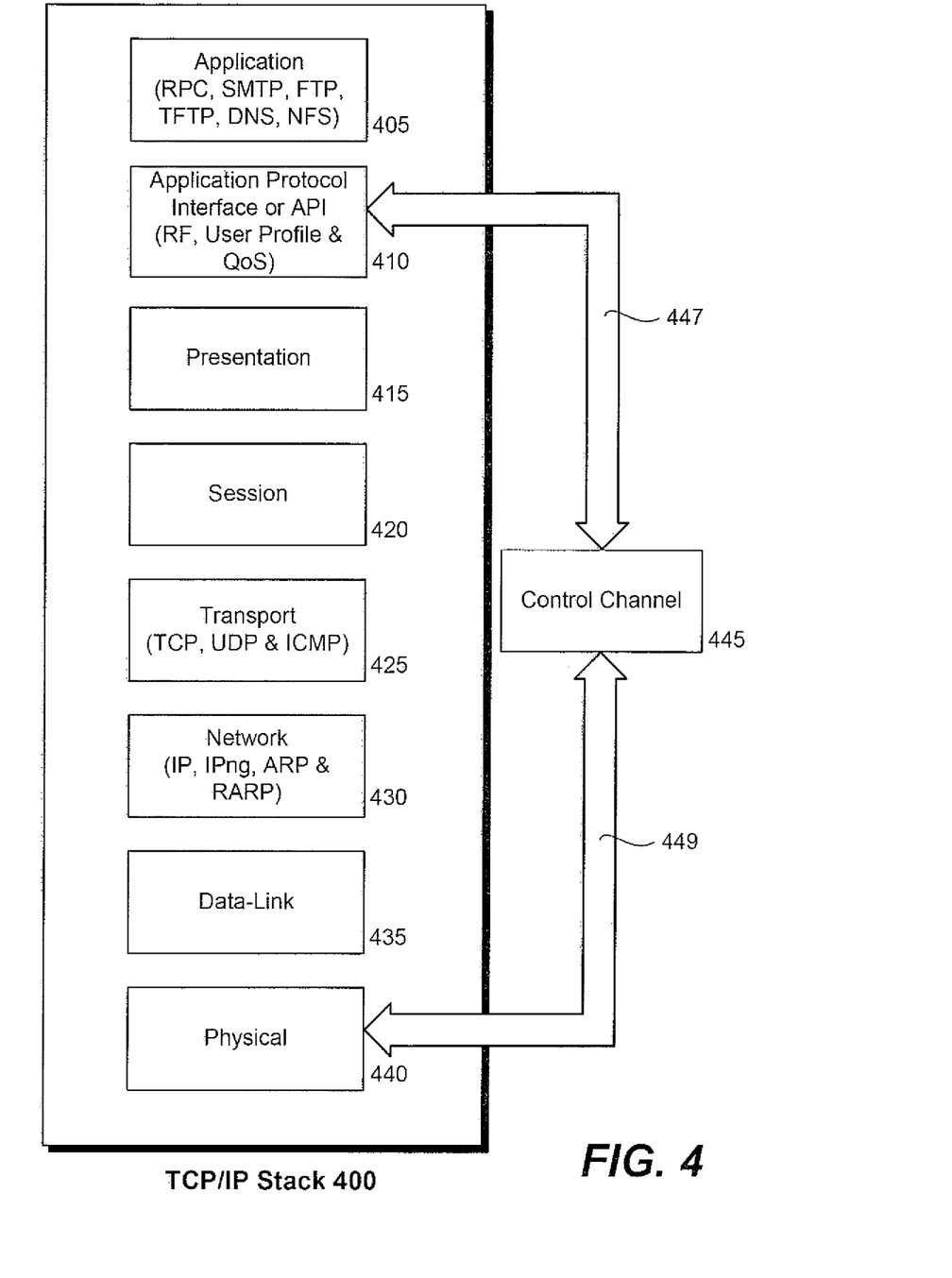
FIG. 4 is a block diagram illustrating a communication stack for optimizing delivery of data by a host to a mobile device over a network, according to one embodiment of the present invention.

FIG. 4 is a block diagram illustrating a communication stack for optimizing delivery of data by a host to a mobile device over a network according to one embodiment of the present invention. As shown in FIG. 4, TCP/IP stack 400 includes application layer 405, application protocol interface (API) 410, presentation layer 415, session layer 420, transport layer 425, network layer 430, data-link layer 435, physical layer 440, and control channel 445.

As shown in FIG. 4, API 410 in TCP/IP stack 400 is in communication with control channel 445 via control path 447 and physical layer 440 is in communication with control channel 445 via control path 449. Control channel 445 can be configured to enable communication between API 410 and physical layer 440 using standard TCP protocol or other suitable protocol. As such, control channel 445 enables direct communication between API 410 and physical layer 440 by bypassing the layers between API 410 and physical layer 440 in TCP/IP stack 400.

API 410 in TCP/IP stack 400 can be configured to receive delivery optimization information and to use the delivery optimization information to determine the priority of the data to be delivered to the mobile device and to provide the priority of the data to a lower layer in TCP/IP stack 400. For example, API 410 can be configured to receive delivery optimization information regarding network conditions from physical layer 440 in TCP/IP stack 400, such as RF condition information describing the strength and/or quality of the RF signals connecting the mobile device to the network. API 410 can then determine a priority of the data based on the RF condition information and provide the priority to physical layer 440. In other embodiments, for example, API 410 can receive delivery optimization information residing outside TCP/IP stack 400, such as quality of service (QoS) information or user profile information which can be used to determine the status of a particular user.

In the embodiment of the invention shown in FIG. 4, for example, RF condition information can be extracted from packets entering physical layer 440 in TCP/IP stack 400. Physical layer 440 can then communicate the RF condition information to API 410 by transmitting packets including RF condition information metadata to API 410 through control channel 445. API 410 can also be configured to receive user profile information, for example, by utilizing data associated with the user of the mobile device, e.g., the user's telephone number, to access a database containing information regarding the user's services or status. API 410 can then use the delivery optimization information to determine a priority of the data to be delivered to a mobile device and can provide the priority of the data to physical layer 440 by transmitting packets that include priority metadata through control channel 445.

Figure 5:
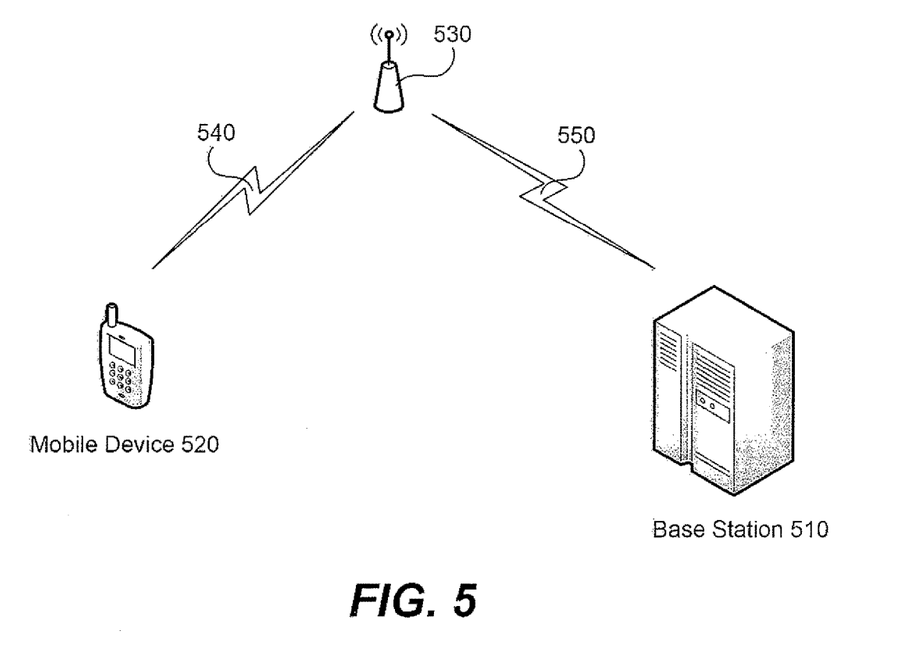
FIG. 5 illustrates a communication system for optimizing delivery of data by a host to a mobile device over a network, according to one embodiment of the present invention.

FIG. 5 illustrates a communication system for optimizing delivery of data by a host to a mobile device over a network in accordance with one embodiment of the invention. FIG. 5 includes base station 510, mobile device 520, and antenna 530. As shown in FIG. 5, base station 510 can establish a communication link with antenna 530, such as communication link 550, and mobile device 520 can establish a communication link with antenna 530, such as communication link 540. For example, antenna 530 can be an antenna capable of transmitting and receiving RF signals used in establishing communication links 540 and 550.

Base station 510 can communicate with mobile device 520 using a communication stack that includes an API between an application layer and a transport layer. For example, base station 510 can implement TCP/IP stack 300 shown in FIG. 3 or TCP/IP stack 400 shown in FIG. 4 to communicate with mobile device 520. As discussed above, the API can receive delivery optimization information and can be configured to determine the priority of the data to be delivered to mobile device 520. The priority of the data can then be provided to the physical layer in the communication stack so that the data is delivered to the mobile device based on the priority of the data.

Figure 6:
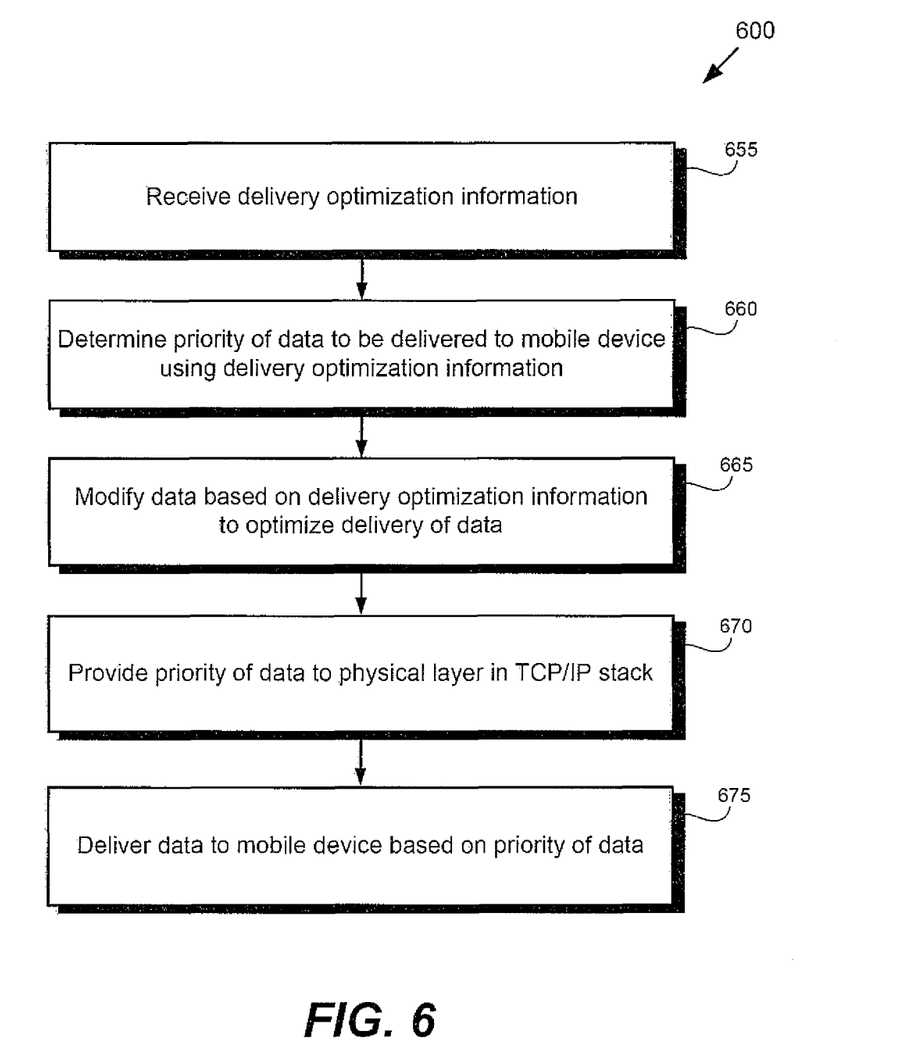
FIG. 6 illustrates a flow diagram of a method for use by a host for optimizing delivery of data to a mobile device over a network, according to one embodiment of the present invention.

FIG. 6 illustrates a flow diagram of a method for use by a host for optimizing delivery of data to a mobile device over a network in accordance with one embodiment of the invention. With reference to the embodiment of the invention shown in FIG. 3 and as shown in FIG. 6, at step 655 of flowchart 600, delivery optimization information is received by API 310. As discussed above, the delivery optimization information can include, for example, the status of network conditions, such as RF condition information describing the strength and/or quality of the RF signals connecting the mobile device to the network, which can be extracted from packets entering physical layer 350. In other embodiments, for example, API 310 can receive delivery optimization information residing outside TCP/IP stack 300, such as quality of service (QoS) information or user profile information. For example, API 310 can utilize data associated with the user of the mobile device, e.g., the user's telephone number, to access a database containing information regarding the user's services or status.

As shown in FIG. 6, at step 660 of flowchart 600, the priority of the data to be delivered to the mobile device is determined using the delivery optimization information received by API 310. For example, if the delivery optimization information received by API 310 includes RF condition information indicating that the quality of the signal connecting the mobile device to the network is poor, then the priority of the data might be determined to be low. As such, the priority of other data to be delivered by the host to other mobile devices on the network experiencing good RF conditions might be determined to be high. In another embodiment, for example, a user profile might be used to determine the priority of the data. In such an embodiment, for example, data to be delivered to the mobile device of a user determined to be a premium user might be determined to have a higher priority than data to be delivered to other mobile devices. In another embodiment, the size of the data requested by each mobile device can be used to determine a priority of the data to be delivered. For example, if there is a request for a large amount of data by a single mobile device ahead of a number of requests for smaller amounts of data by other mobile devices, API 310 might determine a higher priority for the requests including smaller amounts of data than the request including a large amount of data. API 310 can then provide the appropriate priorities of the data to physical layer 350 by adding priority metadata to the additional fields of the modified TCP protocol implemented by transport layer 330. As such, the smaller amounts of data can be advantageously delivered before the large amount of data, thereby preventing the mobile devices requesting smaller amounts of data from being "blocked" by the single mobile device requesting a large amount of data.

At step 665 of flowchart 600 in FIG. 6, API 310 may modify the data to be delivered to the mobile device based on the delivery optimization information in order to deliver the data to the mobile device in an optimal manner. For example, if a large amount of data, such as a large video file, is to be delivered to a mobile device experiencing poor RF signal quality, API 310 can substitute a smaller amount of data, such as a smaller video file, to optimize and facilitate the delivery of the data. Moreover, API 310 can be configured to use the delivery optimization information to control the manner in which the data to be delivered to the mobile device is sliced into packets. For example, API 310 may require the transmission of smaller packets to mobile devices experiencing poor RF conditions to further optimize data delivery.

At step 670 of flowchart 600 in FIG. 6, the priority of the data determined at step 660 is provided to physical layer 350 in TCP/IP stack 300 in FIG. 3. Physical layer 350 can then use the priority of the data to be delivered to the mobile device to schedule delivery of the data. For example, if a host is required to deliver various data to multiple mobile devices, physical layer 350 can be configured to deliver the data having a higher priority before the data having a lower priority. At step 675 of flowchart 600, the data is delivered to the mobile device based on the priority of the data.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for optimizing delivery of first data to a first communication device and second data to a second communication device over a network using a communication stack, said communication stack including an application protocol interface (API) between an application layer and a transport layer, said method comprising:
   receiving, by a physical layer of said communication stack, first conditions of a first communication link connecting said first communication device to said network and second conditions of a second communication link connecting said second communication device to said network;
   communicating, within said communication stack, said first conditions and said second conditions from said physical layer to said API by transmitting said first conditions and said second conditions to said API;
   determining, using said API of said communication stack, a first packet size for said first data based on said first conditions of said first communication link;
   determining, using said API of said communication stack, a second packet size for said second data based on said second conditions of said second communication link;
   delivering to said physical layer, using said API of said communication stack, said first data based on said first packet size for said first communication device and said second data based on said second packet size for said second communication device, wherein said first packet size is smaller than said second packet size when said first conditions are poorer than said second conditions.

2. The method of claim 1, wherein said communication stack includes at least one upper conversion module above said transport layer and at least one lower conversion module below said transport layer, said receiving performed by communicating said first conditions from said physical layer using said at least one lower conversion module to said API using said at least one upper conversion module.

3. The method of claim 1, wherein transmitting said first conditions of said first communication link to said API is performed through a control channel.

4. The method of claim 3, wherein said communication stack further includes a presentation layer and a session layer, and wherein said transmitting said first conditions of said first communication link to said API bypasses at least one of said presentation layer and said session layer of said communication stack.

5. The method of claim 1, wherein said transport layer supports a protocol that includes fields for communicating said first conditions, said receiving performed by communicating said first conditions from said physical layer to said API using said fields for communicating said first conditions.

6. The method of claim 1 further comprising reducing a size of said first data based on said first conditions prior to said delivering said first data.

7. The method of claim 1, wherein said communication stack is a TCP/IP stack.

8. A communication system for optimizing delivery of first data to a first communication device and second data to a second communication device over a network to a communication device, the communication system comprising:
   a communication stack, said communication stack including, an application layer, a transport layer, and a physical layer;
   an application protocol interface (API) located in said communication stack between said application layer and said transport layer;
   wherein said communication stack is configured to:
      receive, by said physical layer of said communication stack, first conditions of a first communication link connecting said first communication device to said network and second conditions of a second communication link connecting said second communication device to said network;
      communicate, within said communication stack, said first conditions and said second conditions from said physical layer to said API by transmitting said first conditions and said second conditions to said API;
      determine, using said API, a first packet size for said first data based on said first conditions of said first communication link;

determine, using said API, a second packet size for said second data based on said second conditions of said second communication link;

deliver to said physical layer, using said API of said communication stack, said first data based on said first packet size for said first communication device and said second data based on said second packet size for said second communication device, wherein said first packet size is smaller than said second packet size when said first conditions are poorer than said second conditions.

9. The communication system of claim 8, wherein said communication stack includes at least one upper conversion module above said transport layer and at least one lower conversion module below said transport layer, said receiving performed by communicating said first conditions from said physical layer using said at least one lower conversion module to said API using said at least one upper conversion module.

10. The communication system of claim 8, wherein said transmitting said first conditions of said first communication link to said API is performed through a control channel.

11. The communication system of claim 10, wherein said communication stack further includes a presentation layer and a session layer, and wherein said transmitting said first conditions of said first communication link to said API bypasses at least one of said presentation layer and said session layer of said communication stack.

12. The communication system of claim 8, wherein said transport layer supports a protocol that includes fields for communicating said first conditions, said receiving performed by communicating said first conditions from said physical layer to said API using said fields for communicating said first conditions.

13. The communication system of claim 8, wherein said API is configured to reduce a size of said first data based on said first conditions prior to said delivering said first data.

14. The communication system of claim 8, wherein said communication stack is a TCP/IP stack.

15. A method for optimizing delivery of a first content to a first communication device and a second content to a second communication device over a network using a communication stack, said communication stack including an application protocol interface (API) between an application layer and a transport layer, said method comprising:

receiving, by a physical layer of said communication stack, first conditions of a first communication link connecting said first communication device to said network and second conditions of a second communication link connecting said second communication device to said network;

communicating, within said communication stack, said first conditions and said second conditions from said physical layer to said API by transmitting said first conditions and said second conditions to said API;

determining, using said API of said communication stack, a first file size desired for said first content based on said first conditions of said first communication link;

determining, using said API of said communication stack, a second file size desired for said second content based on said second conditions of said second communication link;

delivering to said physical layer, using said API of said communication stack, said first content having said first file size for said first communication device and said second content having said second file size for said second communication device, wherein said first file size is smaller than said second file size when said first conditions are poorer than said second conditions.

16. The method of claim 15, wherein said first content is a video content, and wherein said video content with a reduced size is selected by said API based on poor conditions of said first communication link.

17. The method of claim 15, wherein said communication stack includes at least one upper conversion module above said transport layer and at least one lower conversion module below said transport layer, said receiving performed by communicating said first conditions from said physical layer using said at least one lower conversion module to said API using said at least one upper conversion module.

18. The method of claim 15, wherein said transmitting said first conditions of said first communication link to said API is performed through a control channel.

19. The method of claim 18, wherein said communication stack further includes a presentation layer and a session layer, and wherein said transmitting said first conditions of said first communication link to said API bypasses at least one of said presentation layer and said session layer of said communication stack.

20. The method of claim 15, wherein said transport layer supports a protocol that includes fields for communicating said first conditions, said receiving performed by communicating said first conditions from said physical layer to said API using said fields for communicating said first conditions.

* * * * *